(12) United States Patent
Konala et al.

(10) Patent No.: US 11,898,864 B1
(45) Date of Patent: Feb. 13, 2024

(54) AUTONOMOUS VEHICLE CONSUMPTION OF REAL-TIME PUBLIC TRANSPORTATION DATA TO GUIDE CURB ACCESS AND USAGE

(71) Applicant: GM Cruise Holdings LLC, San Francisco, CA (US)

(72) Inventors: Saranya Konala, San Francisco, CA (US); Lucio Otavio Marchioro Rech, San Mateo, CA (US); Ryan Zelen, San Francisco, CA (US); Hooman Barekatain, San Francisco, CA (US); Kyle Liang, San Francisco, CA (US); Abhishek Jain, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 17/539,134

(22) Filed: Nov. 30, 2021

Related U.S. Application Data

(62) Division of application No. 16/371,004, filed on Mar. 31, 2019, now Pat. No. 11,493,353.

(51) Int. Cl.
*G01C 21/34* (2006.01)
*G05D 1/02* (2020.01)
(Continued)

(52) U.S. Cl.
CPC ..... *G01C 21/3476* (2013.01); *G01C 21/3492* (2013.01); *G01C 21/3685* (2013.01);
(Continued)

(58) Field of Classification Search
CPC ............ G01C 21/3476; G01C 21/3492; G01C 21/3685; G05D 1/0088; G05D 1/0212;
(Continued)

(56) References Cited

U.S. PATENT DOCUMENTS 8,432,297 B2 4/2013 Sonnabend et al.
9,429,943 B2 8/2016 Wilson et al.
(Continued)

OTHER PUBLICATIONS

Shen, Y., Zhang, H., & Zhao, J. (2018). Integrating shared autonomous vehicle in public transportation system: A supply-side simulation of the first-mile service in Singapore. Transportation Research Part A: Policy and Practice, 113, 125-136. (Year: 2018).*
(Continued)

*Primary Examiner* — Ig T An
*Assistant Examiner* — Stephanie T Su
(74) *Attorney, Agent, or Firm* — Calfee, Halter & Griswold LLP

(57) ABSTRACT

Various technologies described herein pertain to autonomous vehicle consumption of real-time public transportation data to guide curb access and usage. An autonomous vehicle receives a trip request for a ride specifying a requested pullover location. The autonomous vehicle receives public transportation data specifying an expected arrival time of a public transportation vehicle at a reserved zone within proximity of the requested pullover location. The autonomous vehicle evaluates availability of the reserved zone during an expected occupancy time of the reserved zone by the autonomous vehicle based on the expected arrival time of the public transportation vehicle at the reserved zone. The autonomous vehicle selects an actual pullover location for the ride in the autonomous vehicle based on the availability of the reserved zone during the expected occupancy time. The autonomous vehicle stops at the actual pullover location for the ride in the autonomous vehicle.

20 Claims, 10 Drawing Sheets

(51) Int. Cl.
*G08G 1/14* (2006.01)
*G01C 21/36* (2006.01)
*G05D 1/00* (2006.01)

(52) U.S. Cl.
CPC .......... *G05D 1/0088* (2013.01); *G05D 1/0212* (2013.01); *G05D 1/0291* (2013.01); *G08G 1/146* (2013.01); *G05D 2201/0212* (2013.01); *G05D 2201/0213* (2013.01)

(58) Field of Classification Search
CPC .......... G05D 1/0291; G05D 2201/0212; G05D 2201/0213; G08G 1/146
See application file for complete search history.

(56) References Cited

U.S. PATENT DOCUMENTS

| | | |
|---|---|---|
| 9,816,824 B1 | 11/2017 | Racah et al. |
| 9,911,084 B2 | 3/2018 | Bryson et al. |
| 11,493,353 B1 | 11/2022 | Konala et al. |
| 2013/0041941 A1 | 2/2013 | Tomasic et al. |
| 2013/0110385 A1 | 5/2013 | Heed et al. |
| 2017/0169366 A1* | 6/2017 | Klein .................. G06Q 10/047 |
| 2017/0267233 A1 | 9/2017 | Minster et al. |
| 2018/0202822 A1 | 7/2018 | DeLizio |
| 2018/0308064 A1 | 10/2018 | Glaser |
| 2018/0335781 A1 | 11/2018 | Chase et al. |
| 2019/0066515 A1 | 2/2019 | Dyer et al. |
| 2019/0137290 A1* | 5/2019 | Levy .................. G05D 1/0276 |
| 2019/0204850 A1 | 7/2019 | Panzica et al. |
| 2019/0212744 A1 | 7/2019 | Milstein et al. |
| 2019/0265703 A1 | 8/2019 | Hicok et al. |
| 2019/0373423 A1 | 12/2019 | Li et al. |
| 2020/0027006 A1* | 1/2020 | Gupta .................. G06N 5/04 |
| 2020/0167702 A1* | 5/2020 | Beaurepaire ........ G01C 21/3438 |

OTHER PUBLICATIONS

"Non-Final Office Action for U.S. Appl. No. 16/371,004", dated Nov. 20, 2020, 17 Pages.

"Reply to Non-Final Office Action for U.S. Appl. No. 16/371,004", filed Feb. 22, 2021, 15 Pages.

"Final Office Action for U.S. Appl. No. 16/371,004", dated May 6, 2021, 19 Pages.

"Reply to Final Office Action for U.S. Appl. No. 16/371,004", filed Aug. 6, 2021, 12 Pages.

"Non-Final Office Action for U.S. Appl. No. 16/371,004", dated Sep. 1, 2021, 24 Pages.

"Reply to Non-Final Office Action for U.S. Appl. No. 16/371,004", filed Dec. 1, 2021, 12 Pages.

"Final Office Action for U.S. Appl. No. 16/371,004", dated Jan. 5, 2022, 31 pages.

"Advisory Action for U.S. Appl. No. 16/371,004", dated Apr. 18, 2022, 3 pages.

"Response to the Final Office Action for U.S. Appl. No. 16/371,004", filed Apr. 5, 2022, 13 pages.

"Notice of Allowance and Fees Due for U.S. Appl. No. 16/371,004", dated Jul. 27, 2022, 11 pages.

"Corrected Notice of Allowability for U.S. Appl. No. 16/371,004", dated Sep. 28, 2022, 2 pages.

* cited by examiner

AUTONOMOUS VEHICLE CONSUMPTION OF REAL-TIME PUBLIC TRANSPORTATION DATA TO GUIDE CURB ACCESS AND USAGE

CROSS-REFERENCE TO RELATED APPLICATION

This application is a divisional of U.S. patent application Ser. No. 16/371,004, filed on Mar. 31, 2019, and entitled "AUTONOMOUS VEHICLE CONSUMPTION OF REAL-TIME PUBLIC TRANSPORTATION DATA TO GUIDE CURB ACCESS AND USAGE", the entirety of which is incorporated herein by reference.

BACKGROUND

An autonomous vehicle is a motorized vehicle that can operate without human conduction. An exemplary autonomous vehicle includes a plurality of sensor systems, such as but not limited to, a lidar sensor system, a camera sensor system, and a radar sensor system, amongst others. The autonomous vehicle operates based upon sensor signals outputted by the sensor systems.

Autonomous vehicles can be utilized as part of a ride-sharing service. A challenge in operating such a ride-sharing service is ensuring that passengers are picked up and dropped off in a reasonable location close to their destination. However, current availability of curb space can be limited for conducting pullovers for purposes of picking up and/or dropping off passengers of the autonomous vehicles. For example, in crowded locations, there may be many parked vehicles along the curb while having limited available spots along the curb for autonomous vehicle pullover. The limited availability of curb space can result in longer routes as autonomous vehicles are searching for open spaces in which to pullover. Limited availability of curb space can additionally or alternatively result in the autonomous vehicle double parking, which can block an active travel lane. Double parking can inconvenience other road users since it may block the flow of traffic. Further, parking away from the curb can be less desirable, particularly for passengers of the ride-sharing service who have disabilities or other challenges with respect to entering or exiting the autonomous vehicles.

Existing curb space in cities is often mostly allocated to long-term parking, driveway access, and reserved zones (e.g., bus zones), while a small portion of the curb can be dedicated to active loading and/or unloading. Autonomous vehicle pullovers can be characterized in that loading and/or unloading activities can typically use a moderate amount of available curb space for a short duration of time. For example, an autonomous vehicle may need approximately 16 meters or more space along the curb for a pullover, which can enable the autonomous vehicle to pull in and out without reversing. Moreover, the space along the curb for the autonomous vehicle pullovers typically is to be clear of vehicles and obstructions. Thus, in many crowded locations in various cities, few spaces along the curbs meet such characteristics.

SUMMARY

The following is a brief summary of subject matter that is described in greater detail herein. This summary is not intended to be limiting as to the scope of the claims.

Described herein are various technologies that pertain to autonomous vehicle consumption of real-time public transportation data to guide curb access and usage. Public transportation data that specifies an expected arrival time of a public transportation vehicle at a reserved zone can be utilized to increase efficiency of the curb usage to allow an autonomous vehicle to complete loading and unloading activities. The expected arrival time of the public transportation vehicle at the reserved zone can be utilized to determine whether the reserved zone can be used for a pullover without interfering with the flow of public transportation vehicles.

According to various embodiments, an autonomous vehicle can receive a trip request for a ride in the autonomous vehicle. The trip request can specify a requested pullover location for the ride. The autonomous vehicle can further receive public transportation data. The public transportation data can specify an expected arrival time of a public transportation vehicle at a reserved zone. The reserved zone is for public transportation pickup and drop off (e.g., the reserved zone can be a bus stop). Moreover, the reserved zone can be within proximity of the requested pullover location for the ride. The autonomous vehicle can evaluate availability of the reserved zone during an expected occupancy time of the reserved zone by the autonomous vehicle based on the expected arrival time of the public transportation vehicle at the reserved zone. The autonomous vehicle can further select an actual pullover location for the ride in the autonomous vehicle based on the availability of the reserved zone during the expected occupancy time. For instance, when the autonomous vehicle determines that the reserved zone is available during the expected occupancy time, the reserved zone can be selected as the actual pullover location for the ride. Alternatively, if the reserved zone is determined to be unavailable during the expected occupancy time, then a differing location can be selected as the actual pullover location for the ride in the autonomous vehicle. Moreover, the autonomous vehicle can control at least one mechanical system (e.g., a propulsion system, a braking system, a steering system, etc.) to cause the autonomous vehicle to stop at the actual pullover location for the ride in the autonomous vehicle.

Moreover, according to various embodiments, the autonomous vehicle can plan a route based on the public transportation data specifying the expected arrival time of the public transportation vehicle at the reserved zone. The route can set an expected occupancy time of the reserved zone by the autonomous vehicle during a time period in which the reserved zone is expected to be available. Availability of the reserved zone can be based on the expected arrival time of the public transportation vehicle at the reserved zone. According to various examples, the path followed by the autonomous vehicle from a current location to the reserved zone can be altered to set the expected occupancy time of the reserved zone. Additionally or alternatively, the speed of the autonomous vehicle along the route can be adjusted to alter the expected occupancy time of the reserved zone (e.g., the autonomous vehicle can be stopped at a different location to pause along the route to the reserved zone to avoid the public transportation vehicle at the reserved zone, etc.). The autonomous vehicle can further be controlled to follow the route to the reserved zone for the ride in the autonomous vehicle.

According to various embodiments, a dispatch computing system can employ the public transportation data specifying the expected arrival time of the public transportation vehicle at the reserved zone. The dispatch computing system can receive an input requesting an autonomous vehicle ride from a requested pickup location. The dispatch computing system can select an autonomous vehicle from a fleet of autonomous vehicles for the autonomous vehicle ride. The autonomous vehicle can be selected based on the public transportation data specifying the expected arrival time of the public transportation vehicle at the reserved zone within proximity of the requested pickup location and expected occupancy times of the reserved zone by at least a subset of the autonomous vehicles in the fleet. Further, the dispatch computing system can transmit a trip request for the autonomous vehicle ride to the autonomous vehicle. The trip request can cause the autonomous vehicle to travel to and stop in the reserved zone for pickup for the autonomous vehicle ride.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
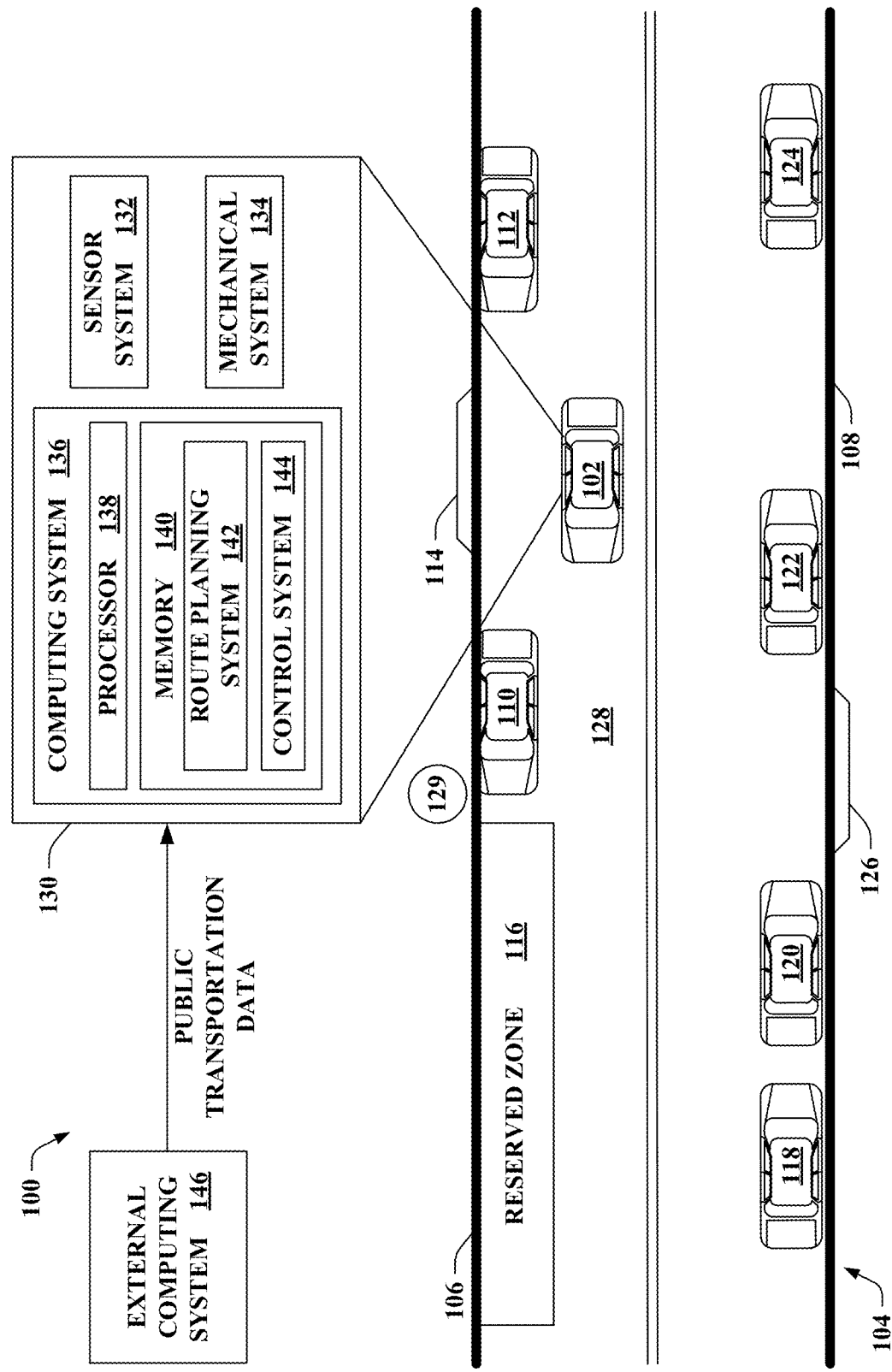
FIG. 1 illustrates an exemplary operating environment of an autonomous vehicle.

Various technologies pertaining to controlling an autonomous vehicle based on real-time public transportation data to guide curb access and usage are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Referring now to the drawings, FIG. 1 illustrates an exemplary operating environment 100 of an autonomous vehicle 102. The operating environment 100 includes a roadway 104 having a curb 106 and a curb 108. In the illustrated example, space along the curb 106 can include space allocated to long-term parking (e.g., parking spaces in which a vehicle 110 and a vehicle 112 are parked), driveway access 114, and a reserved zone 116. Moreover, space along the curb 108 can include space allocated to long-term parking (e.g., parking spaces in which a vehicle 118, a vehicle 120, a vehicle 122, and a vehicle 124 are parked) as well as driveway access 126. As shown in the example, a parking space for long-term parking can be available between the vehicle 122 and the vehicle 124.

The autonomous vehicle 102 is traveling in a lane 128 of the roadway 104. The autonomous vehicle 102 may desirably access space along the curb 106 for loading and/or unloading activities. However, as shown in FIG. 1, the only space along the curb 106 that is currently available is the reserved zone 116. The reserved zone 116 is for public transportation pickup and drop off. For instance, the reserved zone 116 can be a bus stop adjacent to the curb 106 that can be primarily utilized by a bus. Public transportations vehicles may occupy the reserved zone 116 a portion of the time during a day, while the reserved zone 116 may be unused the remainder of the time during a day by the public transportation vehicles. According to an illustration, at a given time in a geographic region (e.g., in a city), a significant portion of bus zones may be unused (e.g., approximately 50 percent of the bus zones may be unused at a given time). Accordingly, the techniques set forth herein enable autonomous vehicles to access and utilize the reserved zones (which are conventionally underutilized) for passenger pickup and drop off, while mitigating interference with public transportation vehicle flow.

According to an example, a location 129 may be set as a requested pullover location for a ride in the autonomous vehicle 102 (e.g., a requested pickup location, a requested drop off location). Due to proximity of the location 129 relative to the reserved zone 116, it may be desirable for the autonomous vehicle 102 to pick up or drop off a passenger for a trip in the autonomous vehicle 102 while the autonomous vehicle 102 is stopped in the reserved zone 116. For instance, the parking space along the curb 108 between the vehicle 122 and the vehicle 124 may be less desirable for picking up or dropping off the passenger for the trip in the autonomous vehicle 102 since such parking space is along the opposite curb 108 across the roadway 104 from the location 129; additionally, the trip of the autonomous vehicle 102 would be extended to reach such parking space (e.g., the autonomous vehicle 102 may go around the block to reach such parking space). Blocking the driveway access 114 or double parking adjacent to the vehicle 110 or the vehicle 112 also may be less desirable relative to use of the reserved zone 116 for picking up or dropping off the passenger for the trip in the autonomous vehicle 102, since double parking or blocking the driveway access 114 may block other road users. While one passenger is described in many of the examples set forth herein, it is contemplated that these examples can be extended to multiple passengers.

Componentry of the autonomous vehicle 102 is shown in callout 130. The autonomous vehicle 102 includes a sensor system 132, a mechanical system 134, and a computing system 136. While the autonomous vehicle 102 is illustrated in FIG. 1 as including a single sensor system 132 and a single mechanical system 134, it is to be understood the autonomous vehicle 102 can include multiple sensor systems and multiple mechanical systems.

The computing system 136 includes a processor 138 and memory 140 as described in greater detail herein. A route planning system 142 and a control system 144 are loaded in the memory 140. The route planning system 142 is configured to plan a route for the autonomous vehicle 102 (e.g., control a pullover location for the autonomous vehicle 102, set a path to the pullover location, etc.) and the control system 144 is configured to control operation of the mechanical system 134 based on sensor signals output by the sensor system 132 and the output of the route planning system 142.

In order to access and utilize the reserved zone 116, the autonomous vehicle 102 can receive public transportation data, where the public transportation data can specify an expected arrival time of a public transportation vehicle at the reserved zone 116. Public transportation data can be received by the autonomous vehicle 102 from an external computing system 146. According to an example, the autonomous vehicle 102 can receive the public transportation data directly from the external computing system 146. According to another example, the autonomous vehicle 102 can receive the public transportation data via a different computing system (e.g., via a dispatch computing system where the dispatch computing system can obtain the public transportation data from the external computing system 146).

Figure 2:
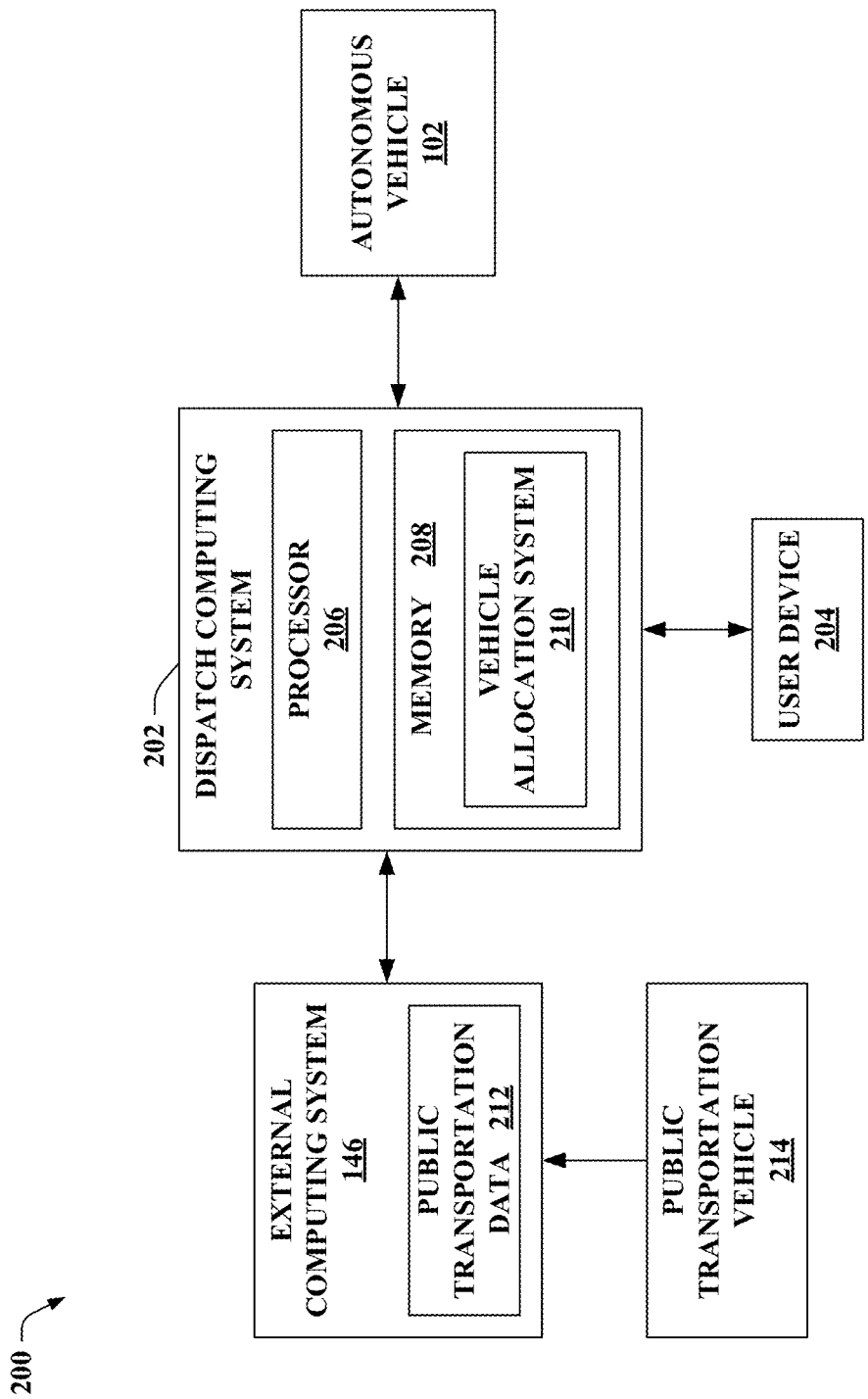
FIG. 2 illustrates a functional block diagram of an exemplary system that utilizes real-time public transportation data to guide curb access and usage.

Now turning to FIG. 2, illustrated is an exemplary system 200 that utilizes real-time public transportation data to guide curb access and usage. The system 200 includes the autonomous vehicle 102 and the external computing system 146. Moreover, the system 200 includes a dispatch computing system 202 and a user device 204. The dispatch computing system 202 includes a processor 206 and memory 208, where a vehicle allocation system 210 is loaded in the memory 208 and configured to send, to the autonomous vehicle 102, a trip request for a ride in the autonomous vehicle 102. The trip request can be sent to the autonomous vehicle 102 by the vehicle allocation system 210 responsive to an input received from the user device 204.

The trip request sent by the vehicle allocation system 210 to the autonomous vehicle 102 can specify a requested pullover location for the ride (e.g., the location 129 of FIG. 1). The requested pullover location can be a requested pickup location for the ride in the autonomous vehicle 102, for example. According to another example, the requested pullover location can be a requested drop off location for the ride in the autonomous vehicle 102. For instance, the requested pullover location can be specified as part of the input received from the user device 204. According to various illustrations, an address, a point of interest, a current location, an intersection, or the like can be included as part of the input sent from the user device 204 to the dispatch computing system 202 to set the requested pullover location.

The requested pullover location can be within proximity of a reserved zone (e.g., the reserved zone 116 of FIG. 1). The reserved zone can be for public transportation pickup and drop off. For example, the reserved zone can be within proximity of the requested pullover location when the reserved zone is within a predefined distance of the requested pullover location (e.g., within 20 meters, on the same side of a roadway). According to another example, the reserved zone can be within proximity of the requested pullover location when the reserved zone is a shortest distance to the requested pullover location out of a set of reserved zones (e.g., a first reserved zone 10 meters from the requested pullover location can be set as being within proximity of the requested pullover location as compared to a next closest reserved zone that is 100 meters from the requested pullover location).

In the example shown in FIG. 2, the dispatch computing system 202 can obtain public transportation data 212 from the external computing system 146. The dispatch computing system 202 can query the external computing system 146 for the public transportation data 212 corresponding to the reserved zone (e.g., query based on a location or identifier of the reserved zone). The public transportation data 212 can specify an expected arrival time of a public transportation vehicle 214 at the reserved zone (e.g., the reserved zone identified as being within proximity of the requested pullover location). According to the example depicted in FIG. 2, the vehicle allocation system 210 can transmit, to the autonomous vehicle 102, the trip request for the ride in the autonomous vehicle 102 along with the public transportation data 212 that specifies the expected arrival time of the public transportation vehicle 214 at the reserved zone. While FIG. 2 shows the dispatch computing system 202 querying the external computing system 146 for the public transportation data 212, it is contemplated that the autonomous vehicle 102 can additionally or alternatively query the external computing system 146 for the public transportation data 212.

As set forth herein, an expected arrival time of the public transportation vehicle 214 at a reserved zone is based on a real-time position of the public transportation vehicle 214. It is to be appreciated that the external computing system 146 can obtain the real-time position of the public transportation vehicle 214 in substantially any manner. For instance, the public transportation vehicle 214 can report the real-time position to the external computing system 146 (e.g., output of global positioning system (GPS) sensors on the public transportation vehicle 214 can be sent to the external computing system 146). Pursuant to another example, autonomous vehicles in a fleet can identify the public transportation vehicle 214 and can signify the location of the public transportation vehicle 214 to the external computing system 146. According to an illustration, the autonomous vehicles in the fleet can determine that a bus at a particular location is assigned to line 237 and, based on the current location of the bus and as well as the line number, the external computing system 146 can predict the expected arrival time of the public transportation vehicle 214 at the reserved zone. Thus, fleet insight can be utilized to generate the public transportation data 212. Moreover, it is to be appreciated that various observation points throughout a city can be utilized to generate the public transportation data 212 (e.g., public cameras can be positioned at intersections throughout the city to perform similar sorts of inferences as set forth above).

Figure 3:
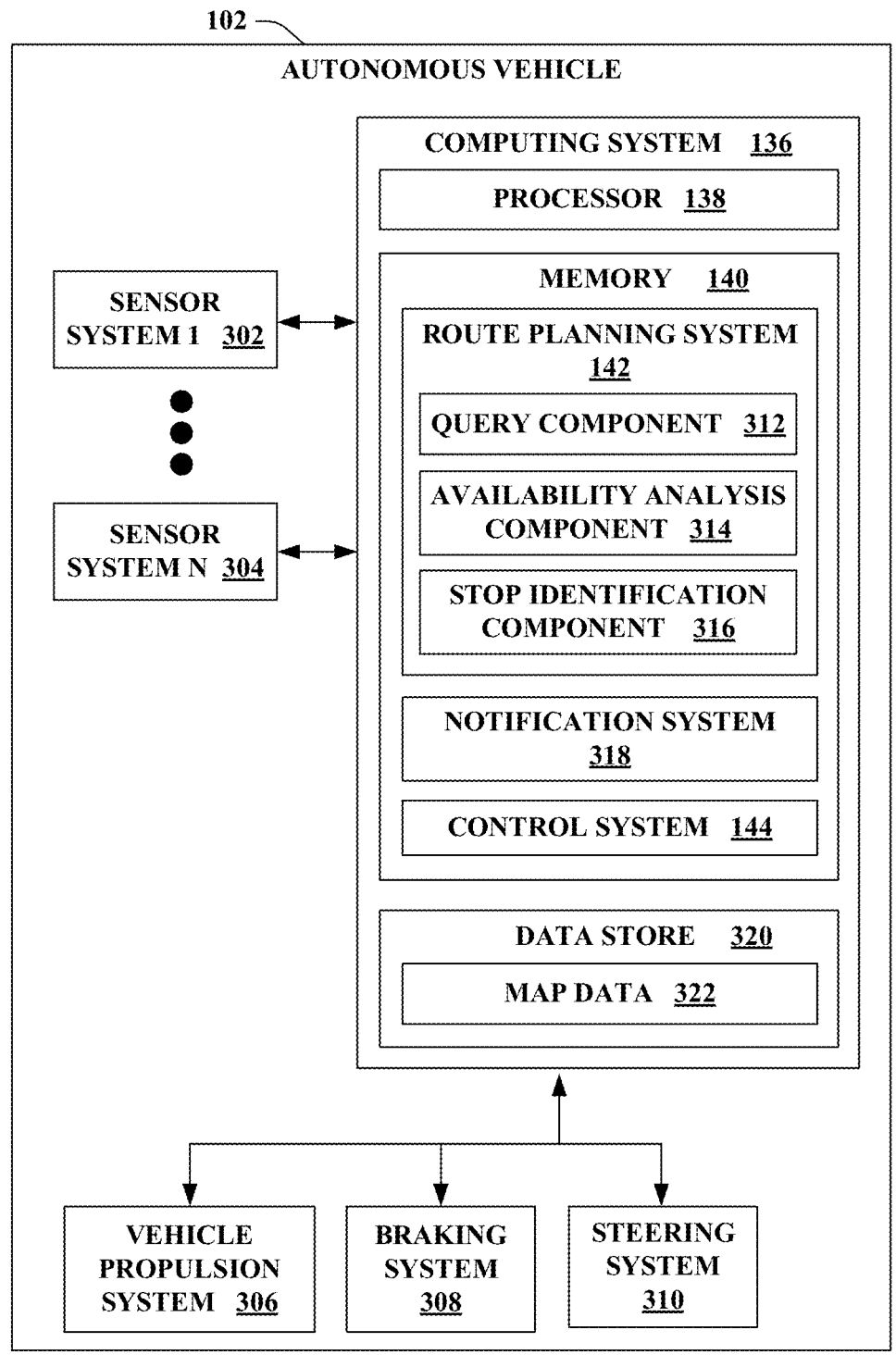
FIG. 3 illustrates a functional block diagram of an exemplary autonomous vehicle.

Turning to FIG. 3 illustrated is a block diagram of the autonomous vehicle 102 according to various embodiments. As shown in FIG. 3, the autonomous vehicle 102 includes a plurality of sensor systems, namely, a sensor system 1 302, ..., and a sensor system N 304, where N is can be substantially any integer greater than one (collectively referred to herein as sensor systems 302-304). The sensor systems 302-304 include the sensor system 132 of FIG. 1. The sensor systems 302-304 are of different types and are arranged about the autonomous vehicle 102. For example, the sensor system 1 302 may be a lidar sensor system and the sensor system N 304 may be a camera (image) sensor system. Other exemplary sensor systems included in the sensor systems 302-304 can include radar sensor systems, GPS sensor systems, sonar sensor systems, infrared sensor systems, and the like.

The autonomous vehicle 102 further includes several mechanical systems (e.g., the mechanical system 134 of FIG. 1) that are used to effectuate appropriate motion of the autonomous vehicle 102. For instance, the mechanical systems can include, but are not limited to, a vehicle propulsion system 306, a braking system 308, and a steering system 310. The vehicle propulsion system 306 may be an electric engine, an internal combustion engine, or a combination thereof. The braking system 308 can include an engine brake, brake pads, actuators, and/or any other suitable componentry that is configured to assist in decelerating the autonomous vehicle 102. The steering system 310 includes suitable componentry that is configured to control the direction of movement of the autonomous vehicle 102.

As described above, the autonomous vehicle 102 further includes the computing system 136, which includes the processor 138 and the memory 140. The computing system 136 is in communication with the sensor systems 302-304, the vehicle propulsion system 306, the braking system 308, and the steering system 310. The memory 140 of the computing system 136 includes computer-executable instructions are executed by the processor 138. Pursuant to various examples, the processor 138 can be or include a graphics processing unit (GPU), a plurality of GPUs, a central processing unit (CPU), a plurality of CPUs, and application-specific integrated circuit (ASIC), a microcontroller, a programmable logic controller (PLC), a field programmable gate array (FPGA), or the like.

The memory 140 includes the route planning system 142 configured to use real-time public transportation data for generating a route for the autonomous vehicle 102 and/or determining locations for pullover of the autonomous vehicle 102. The autonomous vehicle 102 can receive a trip request for a ride in the autonomous vehicle 102 (e.g., from the dispatch computing system 202 of FIG. 2). The trip request can specify a requested pullover location for the ride (e.g., the location 129 of FIG. 1). Moreover, the autonomous vehicle 102 can receive public transportation data (e.g., the public transportation data 212 of FIG. 2).

As described herein, the public transportation data can be received from an external computing system (e.g., from the external computing system 146 directly, via differing computing system(s), or a combination thereof). According to an example, the route planning system 142 can include a query component 312 that can query the external computing system 146 for the public transportation data. Pursuant to another example, the public transportation data can be received with the trip request (e.g., provided by the dispatch computing system 202 of FIG. 2). The public transportation data can specify an expected arrival time of a public transportation vehicle at a reserved zone. The reserved zone can be for public transportation pickup and drop off. Moreover, the reserved zone can be within proximity of the requested pullover location for the ride.

Pursuant to various examples, it is contemplated that the public transportation data, in addition to specifying the expected arrival time of the public transportation vehicle at the reserved zone, can further specify a route identifier of the public transportation vehicle, a reserved zone indicator of the reserved zone, and/or geographic coordinates of the reserved zone. It is to be appreciated that the public transportation data can also report information such as a name of an agency of which the public transportation vehicle is a part. According to an example, the public transportation data can be retrieved via a public transportation application programming interface (API). Thus, the query component 312 of the autonomous vehicle 102 and/or the dispatch computing system 202 can retrieve the public transportation data via the public transportation API. Moreover, while many of the examples set forth herein pertain to public transportation data being obtained for a single reserved zone, it is contemplated that public transportation data for a plurality of reserved zones within proximity of the requested pullover location for the ride can similarly be obtained and utilized.

According to an example, the requested pullover location can be a requested pickup location for the ride in the autonomous vehicle 102. According to another example, the requested pullover location can be requested drop off location for the ride in the autonomous vehicle 102. The reserved zone can be within proximity of the requested pullover location when the reserved zone is within a predefined distance of the requested pullover location. According to another example, the reserved zone can be within proximity of requested pullover location when the reserved zone is a shortest distance to the requested pullover location out of a set of reserved zones (e.g., a closest reserved zone to the requested pullover location can be identified by the route planning system 142 and identified as being within proximity of the requested pullover location).

The route planning system 142 further includes an availability analysis component 314 configured to evaluate the availability of the reserved zone during an expected occupancy time of the reserved zone by the autonomous vehicle 102 based on the expected arrival time of the public transportation vehicle at the reserved zone. According to an example, the availability of the reserved zone during the expected occupancy time of the reserved zone by the autonomous vehicle 102 can further be evaluated by the availability analysis component 314 based on a preset time buffer applied to the expected arrival time. For instance, the query component 312 can query the external computing system 146 for a next arrival time of the public transportation vehicle at the reserved zone. A preset time buffer (e.g., plus or minus 2 minute buffer) can be placed on the expected arrival time of the public transportation vehicle. If the autonomous vehicle 102 is expected to occupy the reserved zone within the time window with the preset time buffer applied to the expected arrival time when the public transportation vehicle is anticipated to occupy the reserved zone 116, then the availability analysis component 314 can identify the reserved zone as being unavailable for pullover (e.g., not an available pullover location). Alternatively, if the autonomous vehicle 102 is expected to occupy the reserved zone outside of the time window, the curb space that is part of the reserved zone 116 can be marked as available for use and the autonomous vehicle 102 can pullover in the curb space to load/unload a passenger.

According to another example, it is contemplated that the availability analysis component 314 can evaluate the availability of the reserved zone during the expected occupancy time of the reserved zone by the autonomous vehicle 102 further based on a dynamic time buffer applied to the expected arrival time. The dynamic time buffer can be based on an amount of time until the expected arrival time of the public transportation vehicle at the reserved zone. For instance, the dynamic time buffer can be larger when there is a larger amount of time between a current time and the expected arrival time of public transportation vehicle, and the dynamic time buffer can be reduced as the time until the expected arrival time of the public transportation vehicle at the reserved zone decreases. Thus, the dynamic time buffer can account for larger variations in an actual arrival time of the public transportation vehicle when being estimated with the public transportation vehicle at a position farther from the reserved zone.

Moreover, the route planning system 142 includes a stop identification component 316 configured to select an actual pullover location for the ride in the autonomous vehicle 102 based on the availability of the reserved zone during the expected occupancy time. The stop identification component 316 can select the reserved zone as the actual pullover location for the ride in the autonomous vehicle 102 when the reserved zone is available during the expected occupancy time, whereas the stop identification component 316 can select a differing location outside the reserved zone as the actual pullover location for the ride in the autonomous vehicle 102 when the reserved zone is unavailable during the expected occupancy time.

In accordance with various examples, it is contemplated that the public transportation data received from the external computing system (e.g., directly and/or indirectly) can be updated over time. For instance, the public transportation data can be concurrently received (or nearly concurrently received) with the trip request (e.g., the public transportation data can be received along with the trip request, the public transportation data can be requested by the query component 312 responsive to receipt of the trip request). Thereafter, as the autonomous vehicle 102 travels towards the requested pullover location for the ride, updated public transportation data can be received from the external computing system (e.g., the query component 312 can query the external computing system 146 for the updated public transportation data over time, the dispatch computing system 202 can send updated public transportation data over time). Use of the updated public transportation data can be substantially similar to use of the public transportation data set forth herein. Thus, the updated public transportation data can allow for availability of a reserved zone to be updated over time as the autonomous vehicle 102 travels towards the reserved zone (e.g., as evaluated by the availability analysis component 314). Moreover, the actual pullover location of the autonomous vehicle 102 for the trip can be updated over time by the stop identification component 316 as the autonomous vehicle 102 travels towards the reserved zone.

The memory 140 additionally includes the control system 144 configured to control at least one of the mechanical systems of the autonomous vehicle 102. Thus, the control system 144 can control the vehicle propulsion system 306, the braking system 308, and/or the steering system 310 to cause autonomous vehicle 102 to stop at the actual pullover location for the ride in the autonomous vehicle 102.

The memory 140 can further include a notification system 318. The notification system 318 can be configured to transmit a notification specifying the actual pullover location for the ride in the autonomous vehicle 102. According to an example, the notification system 318 can transmit the notification to the dispatch computing system 202, and the dispatch computing system 202 can further transmit the notification specifying the actual pullover location for the ride in the autonomous vehicle 102 to the user device 204. For instance, the notification sent by the notification system 318 can indicate that the autonomous vehicle 102 will be picking up the passenger utilizing the user device 204 at a particular reserved zone (e.g., the reserved zone 116 of FIG. 1) nearby a requested pickup location. According to another example, if the reserved zone is unavailable, the notification system 318 can indicate a differing pickup location (e.g., around the block, ahead 50 meters, etc.). Alternatively, the notification system 318 can transmit a notification signifying that the autonomous vehicle 102 will wait for the public transportation vehicle to clear the reserved zone; thereafter, the passenger will be picked up with the autonomous vehicle 102 being in the reserved zone 116 (e.g., the autonomous vehicle 102 will arrive in the reserved zone 116 for passenger pickup in two minutes).

It is further to be appreciated that the notification system 318 can enable two-way communication with the user device 204. For instance, the user device 204 can transmit information specifying that it is desirable to be picked up at the curb with the autonomous vehicle 102 being in a reserved zone (e.g., the passenger is willing to wait until the reserved zone is available).

Moreover, the route planning system 142 can plan a route of the autonomous vehicle 102 to the reserved zone. The route can set the expected occupancy time of the reserved zone by the autonomous vehicle 102 during a time period in which the reserved zone is expected to be available (e.g., as specified based on the public transportation data). Accordingly, the reserved zone can be selected as the actual pullover location when utilizing such route. The route of the autonomous vehicle 102 can be planned by the route planning system 142 to the reserved zone such that the expected occupancy time of the reserved zone by the autonomous vehicle 102 is during a time period in which the reserved zone is expected to be available. Again, availability of the reserved zone can be based on the expected arrival time of the public transportation vehicle at the reserved zone. Following this example, the control system 144 can control the autonomous vehicle (e.g., one or more the mechanical systems) to follow the route to the reserved zone for the ride in the autonomous vehicle 102.

The computing system 136 can further include a data store 320 that can store map data 322. The map data 322 can include data specifying reserved zones. Geographic coordinates of a reserved zone specified as part of received public transportation data can be compared to the stored map data 322 identifying a position of a reserved zone. The stored map data 322 can be modified when a mismatch between the geographic coordinates of the reserved zone specified in the public transportation data and the position of the reserved zone identified in the stored map data 322 is detected. Additionally or alternatively, the reserved zone can be inhibited from being used by the autonomous vehicle 102 when such mismatch is detected. According to an example, the public API can be accessed to associate stop locations with the stored map data 322 identifying the position of the reserved zones as part of the map data 322. Association can be checked to ensure a one-to-one correspondence exists. Accordingly, changes in physical reserved zone locations can result in the latitudes/longitude information not being matched with the reserved zone.

Figure 4:
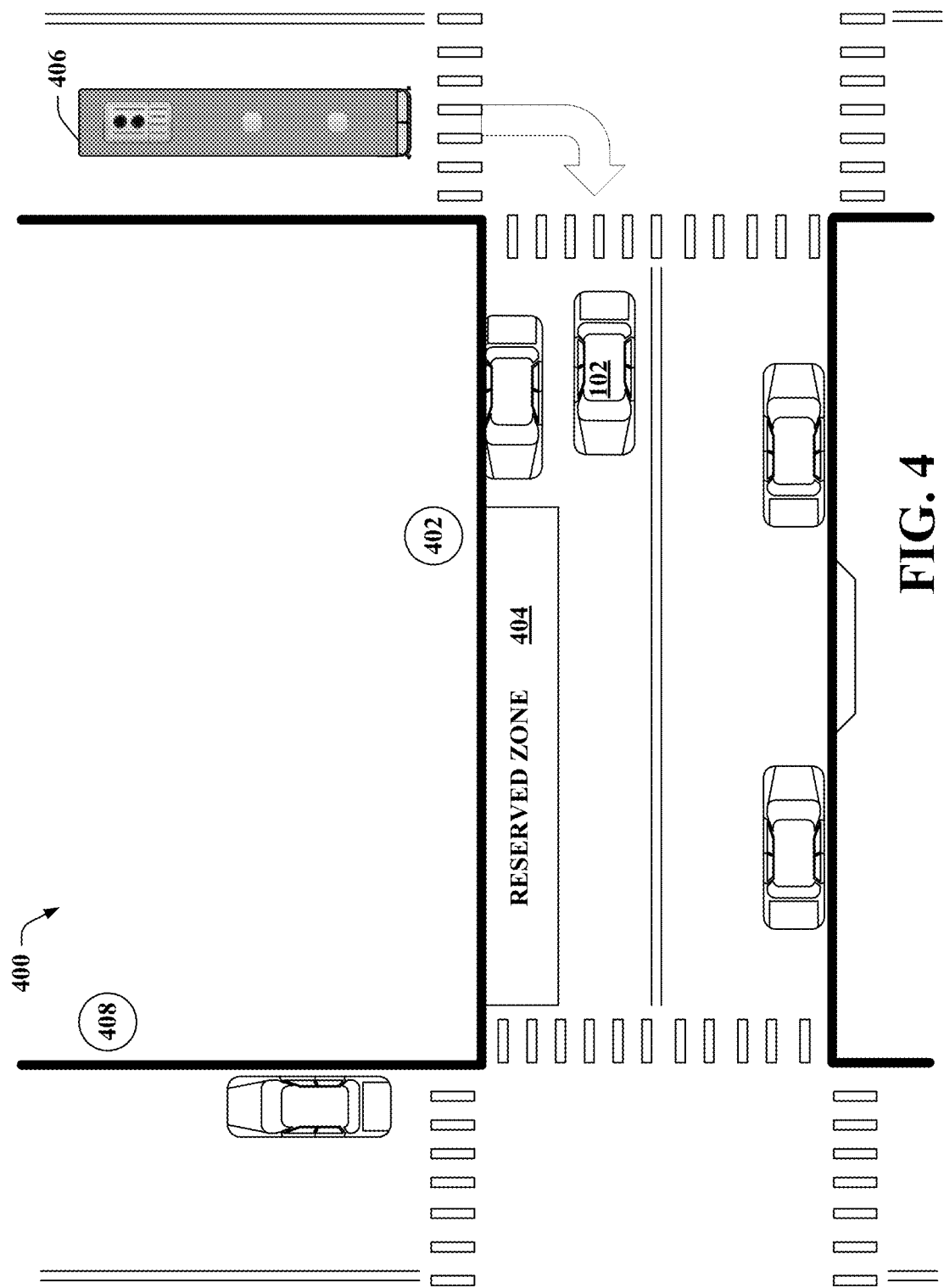
FIG. 4 illustrates another exemplary environment of an autonomous vehicle depicting a scenario in which a reserved zone is unavailable for the autonomous vehicle.

With reference to FIG. 4, illustrated is another exemplary environment 400 of the autonomous vehicle 102 depicting a scenario in which a reserved zone is unavailable for the autonomous vehicle 102. As shown in FIG. 4, a location 402 can be set as a requested pullover location for the ride in the autonomous vehicle 102. Accordingly, the techniques set forth herein can be utilized to detect whether a reserved zone 404 is available during an expected occupancy time by the autonomous vehicle 102 based on an expected arrival time of a bus 406. While FIG. 4 may not be drawn to scale, it is contemplated that the expected occupancy time of the reserved zone 404 by the autonomous vehicle 102 would overlap with an expected arrival time of the bus 406; thus, if the autonomous vehicle 102 were to access and use the reserved zone 404, the autonomous vehicle 102 would interfere with the bus 406. Accordingly, a differing pullover location other than in the reserved zone 404 can be selected for the autonomous vehicle 102 in the scenario shown in FIG. 4. For instance, a location 408 around the corner from the reserved zone 404 can be selected as the actual pullover location for the autonomous vehicle 102. Moreover, although not shown, if the bus 406 were to be leaving the reserved zone 404 as opposed to nearly arriving at the reserved zone 404 as depicted in FIG. 4, then the autonomous vehicle 102 would be able to access and use the reserved zone 404 as an actual pullover location for a ride.

Figure 5:
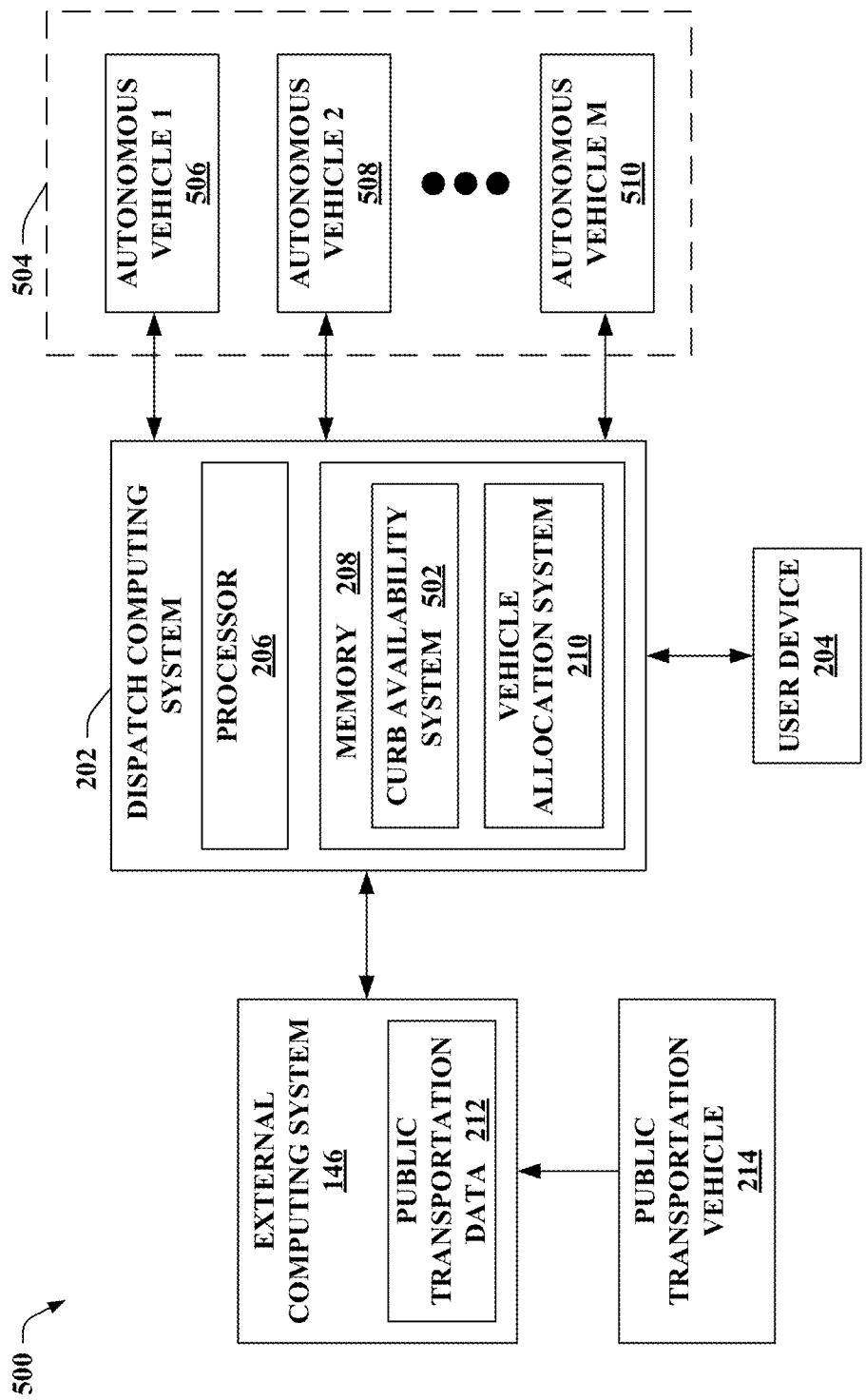
FIG. 5 illustrates a functional block diagram of another exemplary system that utilizes real-time public transportation data to guide curb access and usage.

Referring now to FIG. 5, illustrated is another system 500 that utilizes real-time public transportation data to guide curb access and usage. The system 500 again includes the dispatch computing system 202, the external computing system 146, the user device 204, and the public transportation vehicle 214 (as well as substantiating number of additional public transportation vehicles). Moreover, the system 500 includes a fleet of autonomous vehicles 504. The fleet of autonomous vehicles 504 can include an autonomous vehicle 1 506, an autonomous vehicle 2 508, . . . , and an autonomous vehicle M 510, where M can be substantially any integer greater than 2. According to an example, the autonomous vehicle 102 can be part of the autonomous vehicle fleet 504.

The memory 208 of the dispatch computing system 202 can further include a curb availability system 502. The dispatch computing system 202 can receive an input requesting an autonomous vehicle ride from a requested pickup location. The input can be received from the user device 204. Pursuant to the example depicted in FIG. 5, the curb availability system 502 can evaluate the availability of a reserved zone proximate to the requested pickup location. The curb availability system 502 thus can enable the vehicle allocation system 210 to select an autonomous vehicle from a fleet of autonomous vehicles 504 for the autonomous vehicle ride (e.g., the autonomous vehicle 1 506 can be selected by the vehicle allocation system 210). The autonomous vehicle 1 506 can be selected by the dispatch computing system 202 based on the public transportation data 212 specifying the expected arrival time of the public transportation vehicle 214 at the reserved zone within proximity of the requested pickup location and the expected occupancy times of the reserved zone by at least a subset of the autonomous vehicles in the fleet 504. Thus, the curb availability system 502 can evaluate whether the reserved zone is anticipated to be available for each of the autonomous vehicles in the subset based on the corresponding expected occupancy times of such autonomous vehicles. The autonomous vehicle 1 506 can be selected by the vehicle allocation system 210 when the reserved zone is identified as being available during the expected occupancy time for the autonomous vehicle 1 506. The vehicle allocation system 210 can further transmit a trip request for the autonomous vehicle ride to the selected autonomous vehicle 1 506. The trip request can cause the selected autonomous vehicle 1 506 to travel to and stop at the reserved zone for pickup for the autonomous vehicle ride.

Pursuant to another example, the curb availability system 502 can identify a time period during which the reserved zone would be available for a particular autonomous vehicle (e.g., the autonomous vehicle 1 506) in the fleet 504. Following this example, the vehicle allocation system 210 can transmit a trip request for the autonomous vehicle along with information specifying the time period during which the reserved zone would be available. Based on the information specifying the time period, a route to the reserved zone can be planned (e.g., by the autonomous vehicle 1 506, by the dispatch computing system 202). For instance, the autonomous vehicle 1 506 can delay arriving at the reserved zone until the time period during which the reserved zone is available (e.g., the autonomous vehicle 1 506 can take a longer route, drive slower, pause, etc.).

According to an example, the input received from the user device 204 can specify the requested pickup location as being in the reserved zone (e.g., the user device 204 can be employed to request reserved zone pickup). Following this example, the vehicle allocation system 210 can select an autonomous vehicle (e.g., the autonomous vehicle 1 506) that will be able to access and use the reserved zone for the pickup.

Reference is now generally made to FIGS. 1-5. While a reserved zone is described as a bus stop adjacent to a curb in many of the examples set forth herein, other types of reserved zones are intended to fall within the scope of the hereto appended claims. According to an example, the reserved zone can be a public transportation lane (e.g., a bus lane). Further, other types of public transportation vehicles are intended to fall within the scope of the hereto appended claims.

FIGS. 6-9 illustrate exemplary methodologies relating to controlling an autonomous vehicle based on real-time public transportation data to guide curb access and usage. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 6:
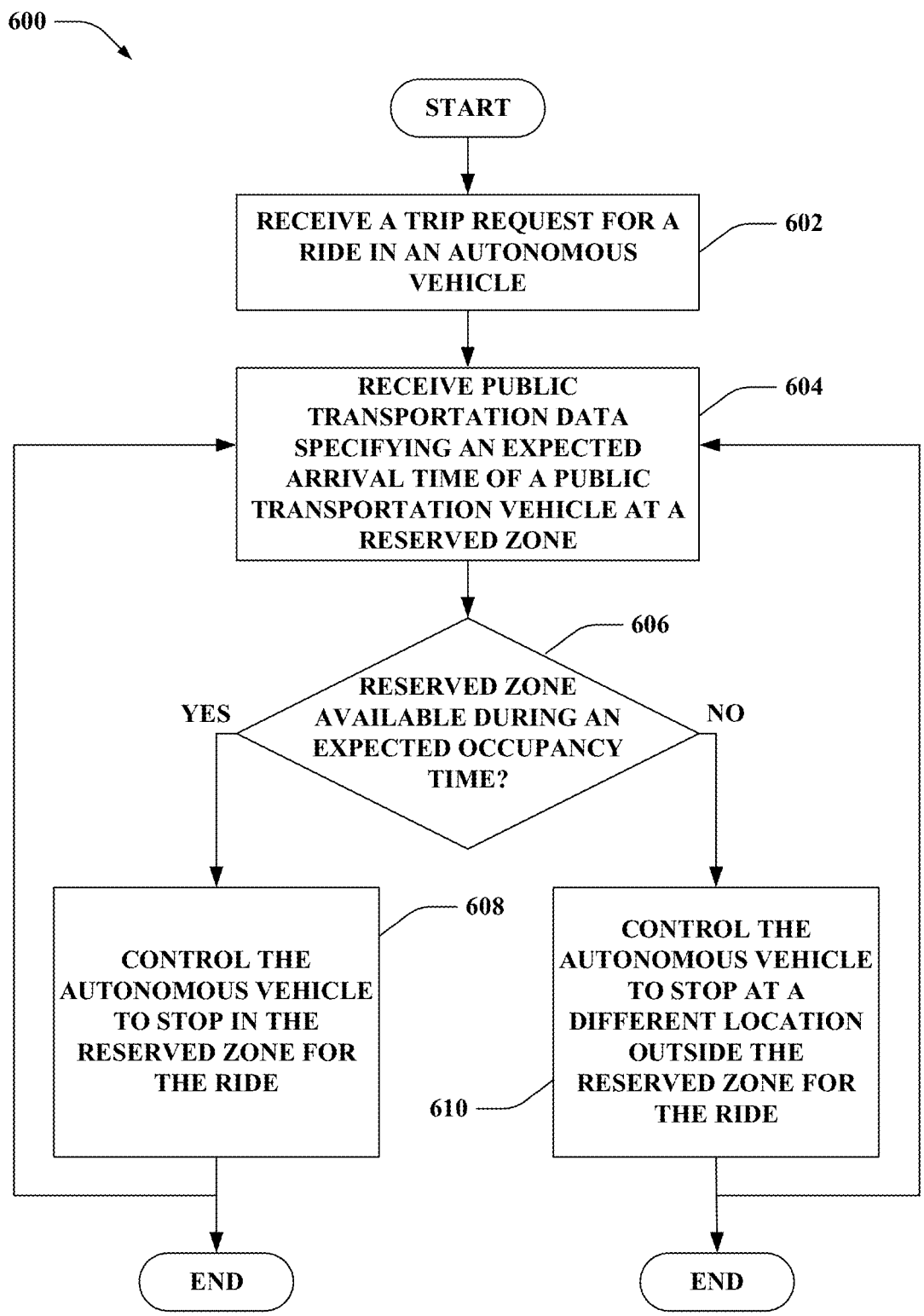
FIG. 6 depicts a flow diagram that illustrates an exemplary methodology of controlling an autonomous vehicle.

FIG. 6 illustrates a methodology 600 of controlling an autonomous vehicle. At 602, a trip request for a ride in the autonomous vehicle can be received (e.g., by the autonomous vehicle, from a dispatch computing system). The trip request can specify a requested pullover location for the ride. At 604, public transportation data specifying an expected arrival time of a public transportation vehicle at a reserved zone can be received (e.g., by the autonomous vehicle). The public transportation data can be received from an external computing system, a dispatch computing system (e.g., the dispatch computing system can obtain the public transportation data from the external computing system), or the like. Moreover, the reserved zone can be for public transportation pickup and drop off. Additionally, the reserved zone can be within proximity of the requested pullover location for the ride. At 606, a determination can be made concerning whether the reserved zone will be available during an expected occupancy time of the reserved zone by the autonomous vehicle (e.g., based on the expected arrival time of the public transportation vehicle at the reserved zone specified as part of the public transportation data). When the reserved zone is determined to be available during the expected occupancy time at 606, the methodology 600 can continue to 608. At 608, the autonomous vehicle can be controlled to stop in the reserved zone for the ride (e.g., the reserved zone can be utilized as an actual pullover location for the ride). Alternatively, when the reserved zone is determined to be unavailable during the expected occupancy time at 606, the methodology 600 can continue to 610. At 610, the autonomous vehicle can be controlled to stop at a different location outside the reserved zone for the ride. Accordingly, the different location can be utilized as the actual pullover location for the ride when the reserved zone is unavailable during the expected occupancy time of the autonomous vehicle.

According to various examples, it is contemplated that updated public transportation data specifying an updated expected arrival time of the public transportation vehicle at the reserved zone can be received as the autonomous vehicle is traveling towards the actual pullover location (the methodology 600 can return to 604). Thus, (at 606) a determination can be made concerning whether the reserved zone will be available during the expected occupancy time of the reserved zone by the autonomous vehicle based on the updated expected arrival time of the public transportation vehicle. Accordingly (at 608 and 610), the actual pullover location for the ride can be updated over time as the autonomous vehicle travels towards the actual pullover location based on the updated public transportation data. By way of illustration, the reserved zone may initially be identified as being available; however, as the autonomous vehicle travels to the reserved zone, the predicted availability of the reserved zone can change such that the reserved zone is later identified as being unavailable during the expected occupancy time. Following this illustration, the actual pullover location can change from being the reserved zone to being a different location outside the reserved zone for the ride in the autonomous vehicle.

Figure 7:
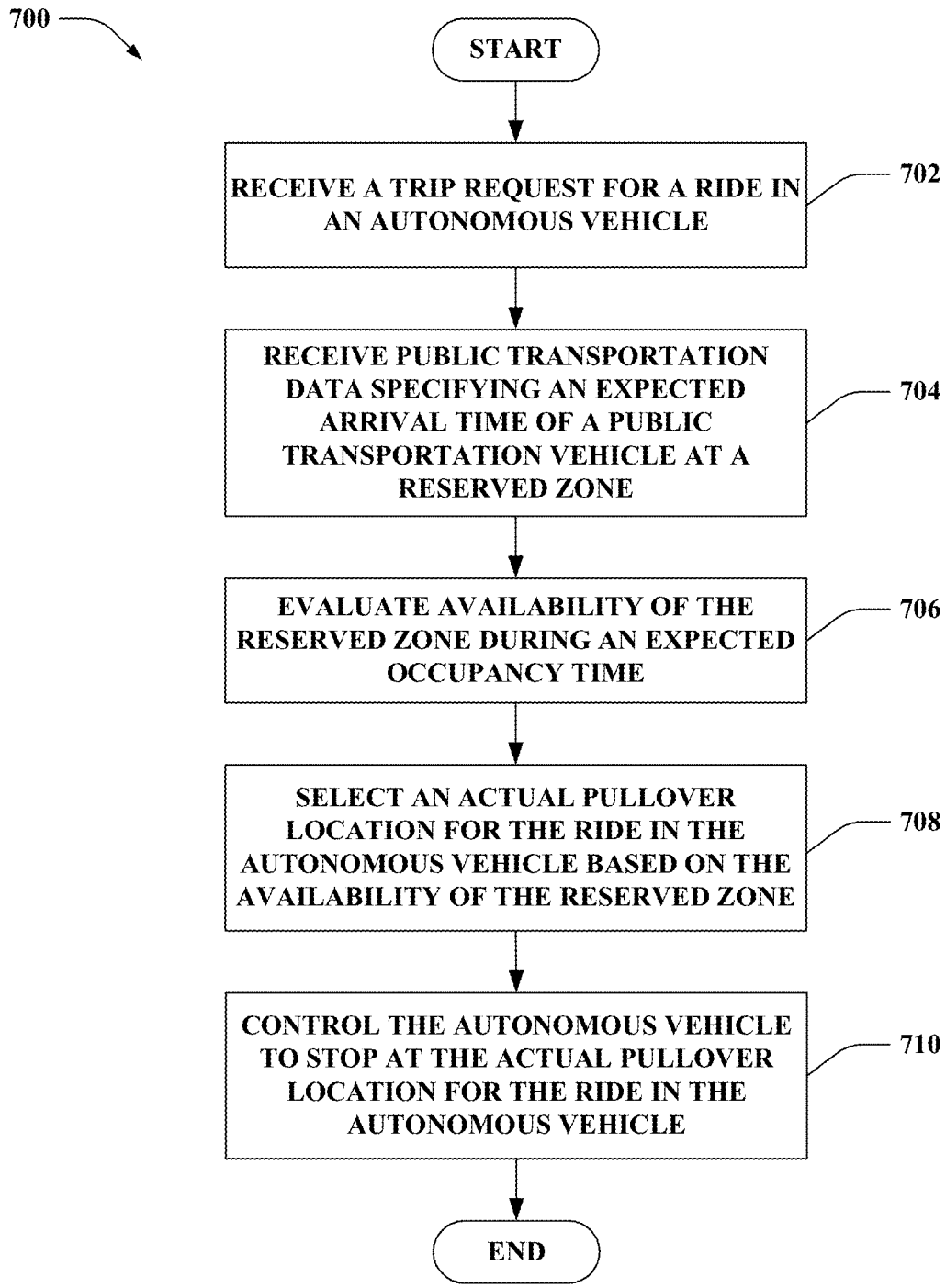
FIG. 7 depicts a flow diagram that illustrates another exemplary methodology of controlling an autonomous vehicle.

With reference to FIG. 7, illustrated is another methodology 700 of controlling an autonomous vehicle. At 702, a trip request for a ride in the autonomous vehicle can be received. The trip request can specify the requested pullover location for the ride. At 704, public transportation data specifying an expected arrival time of a public transportation vehicle at a reserved zone can be received. Similar to above, the reserved zone can be for public transportation pickup and drop off and the reserved zone can be within proximity of the requested pullover location for the ride. At 706, availability of the reserved zone during an expected occupancy time of the reserved zone by the autonomous vehicle can be evaluated based on the expected arrival time of the public transportation vehicle at the reserved zone. At 708, an actual pullover location for the ride in the autonomous vehicle can be selected based on the availability of the reserved zone during the expected occupancy time (e.g., the reserved zone can be selected as the actual pullover location for the ride when available). At 710, at least one mechanical system of the autonomous vehicle can be controlled to cause the autonomous vehicle to stop at the actual pullover location for the ride in the autonomous vehicle.

Figure 8:
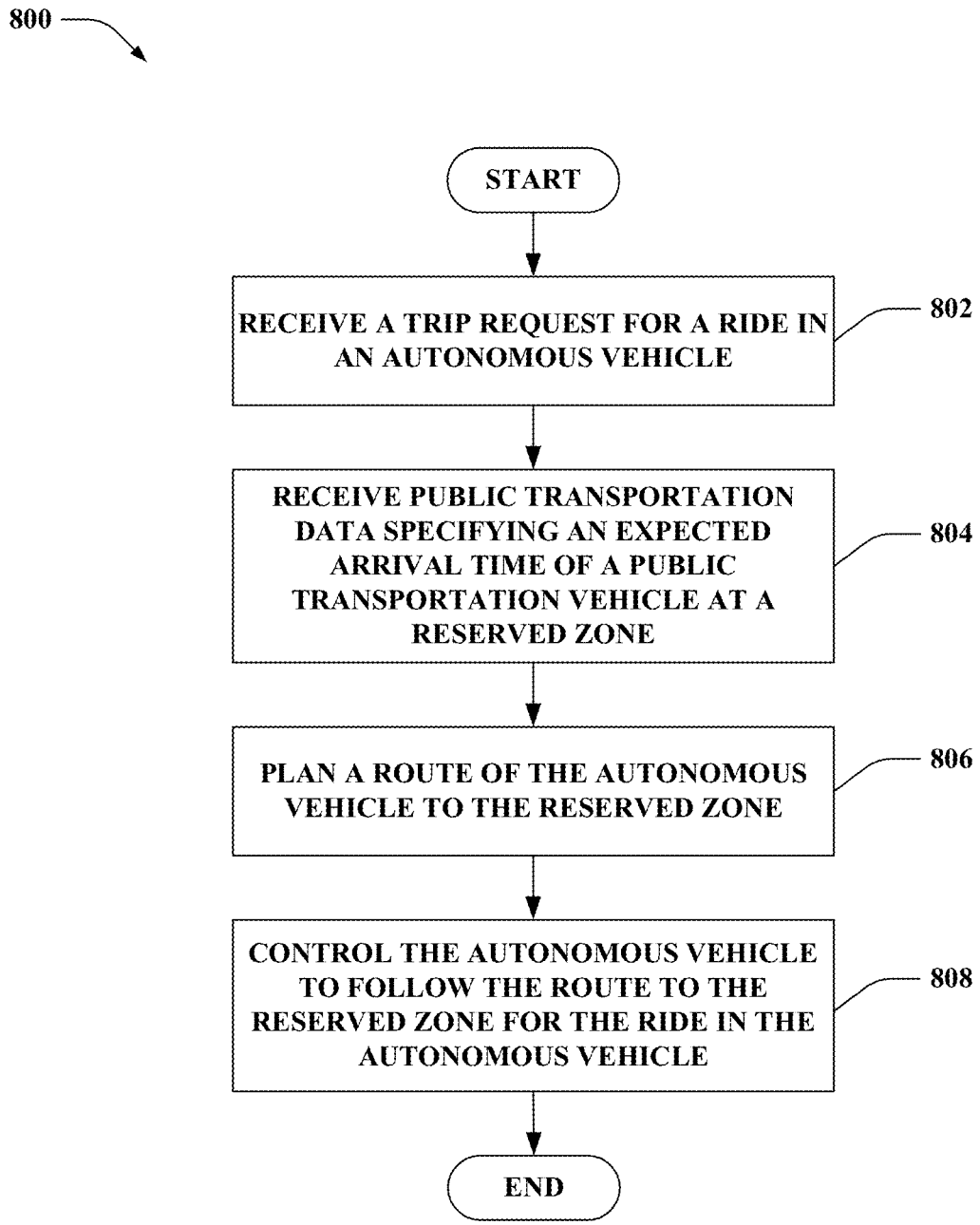
FIG. 8 depicts a flow diagram that illustrates yet another exemplary methodology of controlling an autonomous vehicle.

Now referring to FIG. 8, illustrated is yet another methodology 800 of controlling an autonomous vehicle. At 802, the trip request for the ride in the autonomous vehicle can be received. At 804, the public transportation data specifying the expected arrival time of the public transportation vehicle at the reserved zone can be received. Again, the reserved zone can be within proximity of the requested pullover location for the ride. At 806, a route of the autonomous vehicle to the reserved zone can be planned. The route can set an expected occupancy time of the reserved zone by the autonomous vehicle during a time period in which the reserved zone is expected to be available. Availability of the reserved zone can be based on the expected arrival time the public transportation vehicle at the reserved zone. At 808, the autonomous vehicle can be controlled to follow the route to the reserved zone for the ride in the autonomous vehicle (e.g., such that the autonomous vehicle can stop within the reserved zone for pickup or drop off).

Figure 9:
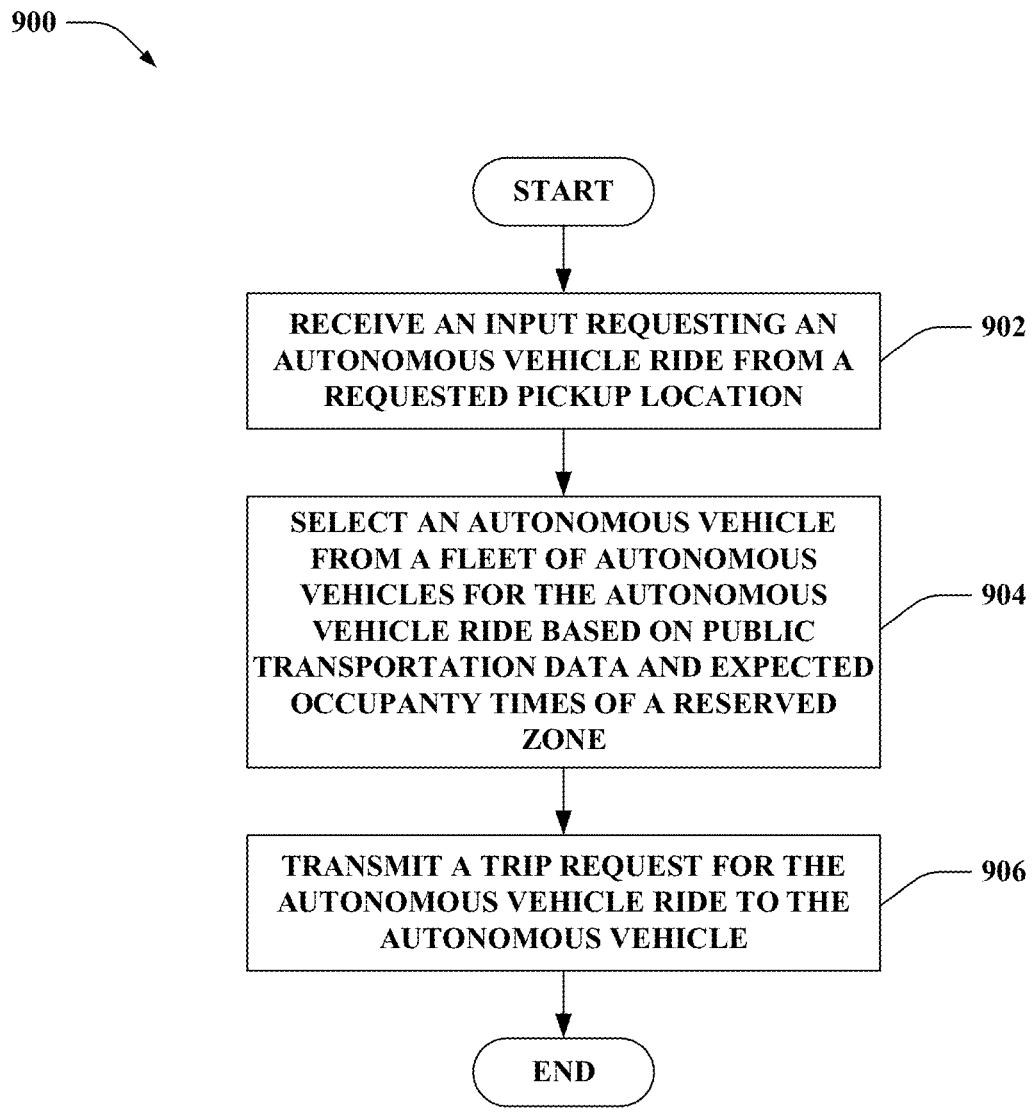
FIG. 9 depicts a flow diagram that illustrates an exemplary methodology of controlling dispatch of autonomous vehicles based on availability of reserved zones.

Turning now to FIG. 9, illustrated is a methodology 900 of controlling dispatch of autonomous vehicles based on availability of reserved zones. At 902, an input requesting an autonomous vehicle ride from a requested pickup location can be received. At 904, an autonomous vehicle can be selected from a fleet of autonomous vehicles for the autonomous vehicle ride. The autonomous vehicle can be selected based on public transportation data specifying an expected arrival time of a public transportation vehicle at a reserved zone within proximity of the requested pickup location and expected occupancy times of the reserved zone by at least a subset of the autonomous vehicles in the fleet. For instance, the autonomous vehicle can be selected such that the autonomous vehicle is identified as having an expected occupancy time of the reserved zone during a period of time that the public transportation vehicle is not expected to occupy the reserved zone. At 906, the trip request can be transmitted for the autonomous vehicle ride to the autonomous vehicle as selected. The trip request can cause the autonomous vehicle to travel to and stop in the reserved zone for pickup for the autonomous vehicle ride.

Figure 10:
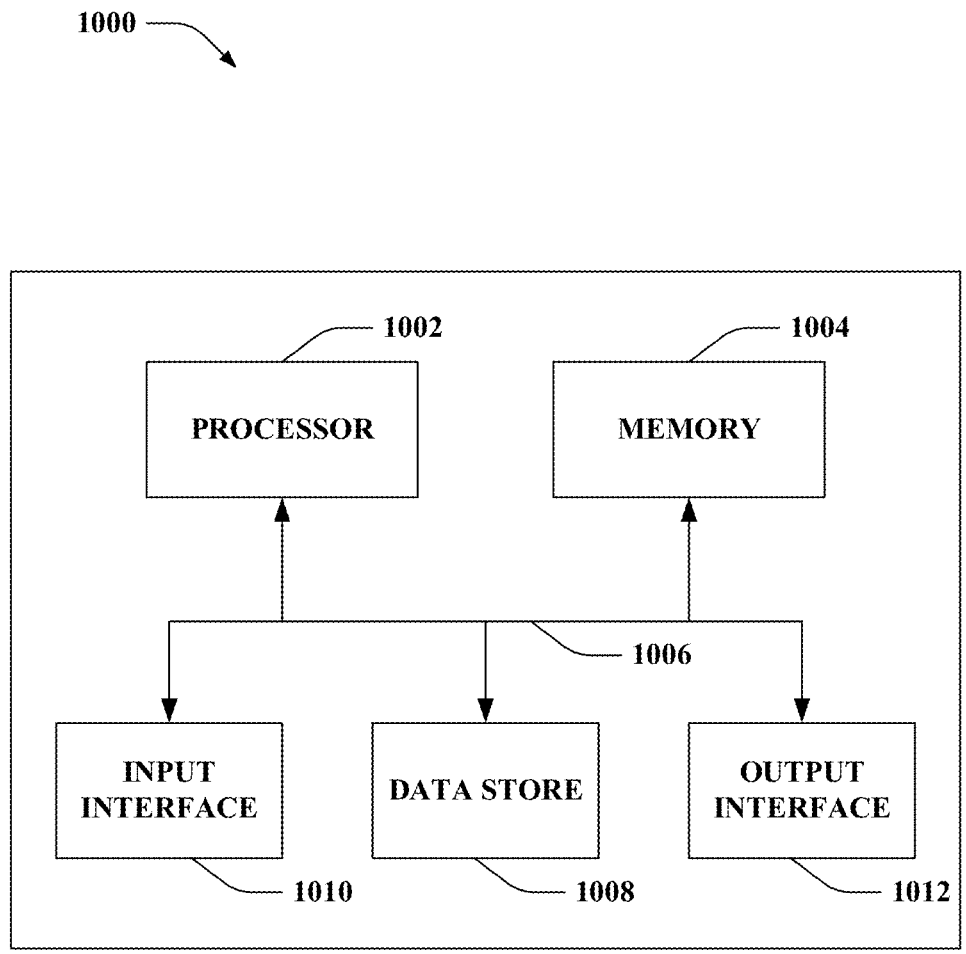
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be or include the computing system 136 (or the computing system 136 can include the computing device 1000). According to other examples, the dispatch computing system 202, the external computing system 146, or the user device 204 can be or include the computing device 1000. The computing device 1000 includes at least one processor 1002 that executes instructions that are stored in a memory 1004. The instructions may be, for instance, instructions for implementing functionality described as being carried out by one or more systems discussed above or instructions for implementing one or more of the methods described above. The processor 1002 may be a GPU, a plurality of GPUs, a CPU, a plurality of CPUs, a multi-core processor, etc. The processor 1002 may access the memory 1004 by way of a system bus 1006. In addition to storing executable instructions, the memory 1004 may also store public transportation data, map data, data specifying expected occupancy time(s), data specifying a route of an autonomous vehicle to a reserved zone, and so forth.

The computing device 1000 additionally includes a data store 1008 that is accessible by the processor 1002 by way of the system bus 1006. The data store 1008 may include executable instructions, public transportation data, map data, data specifying expected occupancy time(s), data specifying a route of an autonomous vehicle to a reserved zone etc. The computing device 1000 also includes an input interface 1010 that allows external devices to communicate with the computing device 1000. For instance, the input interface 1010 may be used to receive instructions from an external computer device, etc. The computing device 1000 also includes an output interface 1012 that interfaces the computing device 1000 with one or more external devices. For example, the computing device 1000 may transmit control signals to the vehicle propulsion system 306, the braking system 308, and/or the steering system 310 by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A dispatch computing system, comprising:
   a processor; and
   memory that stores computer-executable instructions that, when executed by the processor, cause the processor to perform acts comprising:
   receiving an input requesting an autonomous vehicle ride from a requested pickup location;
   identifying expected occupancy times of a reserved zone within proximity of the requested pickup location for autonomous vehicles in a fleet of autonomous vehicles, the expected occupancy times being identified based on current locations of the autonomous vehicles and planned routes to the reserved zone from the current locations of the autonomous vehicles.
   retrieving public transportation data specifying an expected arrival time of a public transportation vehicle at the reserved zone from an external computing system, the expected arrival time of the public transportation vehicle at the reserved zone is based on a real-time position of the public transportation vehicle;
   evaluating availability of the reserved zone during the expected occupancy times of the reserved zone for the autonomous vehicles based on the expected arrival time of the public transportation vehicle at the reserved zone;
   selecting an autonomous vehicle from the fleet of autonomous vehicles for autonomous vehicle ride, the autonomous vehicle being selected based on the availability of the reserved zone during the expected occupancy times of the reserved zone for the autonomous vehicles such that the autonomous vehicle is expected to travel along a planned route to the reserved zone from a current location of the autonomous vehicle and arrive at the reserved zone while the reserved zone is available; and transmitting a trip request for the autonomous vehicle ride to the autonomous vehicle, the trip request causes the autonomous vehicle to travel along the planned route to the reserved zone from the current location of the autonomous vehicle, arrive at the reserved zone while the reserved zone is available, and stop in the reserved zone for pickup for the autonomous vehicle ride.

2. The dispatch computing system of claim 1, wherein the reserved zone is for public transportation pickup and drop off.

3. The dispatch computing system of claim 1, wherein the input specifies the requested pickup location as being in the reserved zone.

4. The dispatch computing system of claim 1, wherein the public transportation vehicle is a bus and the reserved zone is a bus stop adjacent to a curb.

5. The dispatch computing system of claim 1, wherein the real-time position of the public transportation vehicle is detected by at least one autonomous vehicle in the fleet.

6. The dispatch computing system of claim 5, wherein the at least one autonomous vehicle in the fleet detects an identification number of the public transportation vehicle and the real-time position of the public transportation vehicle, wherein the identification number specifies the public transportation vehicle from a plurality of public transportation vehicles, and wherein the at least one autonomous vehicle in the fleet reports the identification number of the public transportation vehicle and the real-time position of the public transformation vehicle to the external computing system.

7. The dispatch computing system of claim 1, the availability of the reserved zone during the expected occupancy times of the reserved zone by the autonomous vehicles is further evaluated based on a preset time buffer applied to the expected arrival times.

8. The dispatch computing system of claim 1, the availability of the reserved zone during the expected occupancy times of the reserved zone by the autonomous vehicles is further evaluated based on a dynamic time buffer applied to the expected arrival times, the dynamic time buffer being based on an amount of time until the expected arrival time of the public transportation vehicle at the reserved zone.

9. The dispatch computing system of claim 1, wherein the public transportation data further specifies a route identifier of the public transportation vehicle, a reserved zone indicator of the reserved zone, and geographic coordinates of the reserved zone.

10. The dispatch computing system of claim 1, wherein the trip request comprises information specifying a time period during which the reserved zone would be available.

11. The dispatch computing system of claim 10, wherein the trip request causes the autonomous vehicle to delay arriving at the reserved zone until the time period during which the reserved zone would be available.

12. The dispatch computing system of claim 1, the acts further comprising:

receiving, from the autonomous vehicle, a notification specifying that the autonomous vehicle will wait for the public transportation vehicle to clear the reserved zone prior to the pickup for the autonomous vehicle ride; and transmitting, to a user device of a passenger requesting the autonomous vehicle ride, the notification specifying that the autonomous vehicle will wait for the public transportation vehicle to clear the reserved zone prior to the pickup for the autonomous vehicle ride.

13. A method of dispatching an autonomous vehicle, comprising:

receiving an input requesting an autonomous vehicle ride from a requested pickup location;

identifying expected occupancy times of a reserved zone within proximity of the requested pickup location for autonomous vehicles in a fleet of autonomous vehicles, the expected occupancy times being identified based on current locations of the autonomous vehicles and planned routes to the reserved zone from the current locations of the autonomous vehicles;

retrieving public transportation data specifying an expected arrival time of a public transportation vehicle at the reserved zone from an external computing system, the expected arrival time of the public transportation vehicle at the reserved zone is based on a real-time position of the public transportation vehicle;

evaluating availability of the reserved zone during the expected occupancy times of the reserved zone for the autonomous vehicles based on the expected arrival time of the public transportation vehicle at the reserved zone;

selecting the autonomous vehicle from the fleet of autonomous vehicles for the autonomous vehicle ride, the autonomous vehicle being selected based on the availability of the reserved zone during the expected occupancy times of the reserved zone for the autonomous vehicles such that the autonomous vehicle is expected to travel along a planned route to the reserved zone from a current location of the autonomous vehicle and arrive at the reserved zone while the reserved zone is available; and transmitting a trip request for the autonomous vehicle ride to the autonomous vehicle, the trip request causes the autonomous vehicle to travel along the planned route to the reserved zone from the current location of the autonomous vehicle, arrive at the reserved zone while the reserved zone is available, and stop in the reserved zone for pickup for the autonomous vehicle ride.

14. The method of claim 13, wherein the input specifies the requested pickup location as being in the reserved zone.

15. The method of claim 13, wherein the real-time position of the public transportation vehicle is detected by at least one autonomous vehicle in the fleet.

16. The method of claim 13, the availability of the reserved zone during the expected occupancy times of the reserved zone by the autonomous vehicles is further evaluated based on a time buffer applied to the expected arrival times.

17. The method of claim 13, wherein an identifier specifies the public transportation vehicle from a plurality of public transportation vehicles, wherein the identifier of the public transportation vehicle and the real-time position of the public transportation vehicle are detected by at least one autonomous vehicle in the fleet, and wherein the at least one autonomous vehicle in the fleet reports the identifier of the public transportation vehicle and the real-time position of the public transportation vehicle to the external computing system.

18. The method of claim 13, further comprising:

receiving, from the autonomous vehicle, a notification specifying that the autonomous vehicle will wait for the public transportation vehicle to clear the reserved zone prior to the pickup for the autonomous vehicle ride; and transmitting, to a user device of a passenger requesting the autonomous vehicle ride, the notification specifying that the autonomous vehicle will wait for the public transportation vehicle to clear the reserved zone prior to the pickup for the autonomous vehicle ride.

19. A method of dispatching an autonomous vehicle, comprising:

receiving an input requesting an autonomous vehicle ride from a requested pickup location;

selecting the autonomous vehicle from a fleet of autonomous vehicles for the autonomous vehicle ride;

retrieving public transportation data specifying an expected arrival time of a public transportation vehicle at the reserved zone from an external computing system, the expected arrival time of the public transportation vehicle at the reserved zone is based on a real-time position of the public transportation vehicle and an identifier of the public transportation vehicle, wherein the real-time position of the public transportation vehicle and the identifier of the public transportation vehicle are detected by at least one differing autonomous vehicle in the fleet wherein the identifier specifies the public transportation vehicle from a plurality of public transportation vehicles, and wherein the at least one differing autonomous vehicle in the fleet reports the real-time position of the public transportation vehicle and the identifier of the public transportation vehicle to the external computing system;

evaluating availability of a reserved zone within proximity of the requested pickup location during an expected occupancy time of the reserved zone by the autonomous vehicle based on the expected arrival time of the public transportation vehicle at the reserved zone; and transmitting a trip request for the autonomous vehicle ride to the autonomous vehicle, the trip request causes the autonomous vehicle to travel to and stop in the reserved zone for pickup for the autonomous vehicle ride, wherein the trip request comprises information specifying a time period during which the reserved zone would be available, and wherein the trip request causes the autonomous vehicle to delay arriving at the reserved zone until the time period during which the reserved zone would be available.

20. The method of claim 19, further comprising:

receiving, from the autonomous vehicle, a notification specifying that the autonomous vehicle will wait for the public transportation vehicle to clear the reserved zone prior to the pickup for the autonomous vehicle ride; and transmitting, to a user device of a passenger requesting the autonomous vehicle ride, the notification specifying that the autonomous vehicle will wait for the public transportation vehicle to clear the reserved zone prior to the pickup for the autonomous vehicle ride.

* * * * *